(12) United States Patent
Johnson, Jr. et al.

(10) Patent No.: US 10,853,716 B2
(45) Date of Patent: Dec. 1, 2020

(54) SYSTEMS AND METHODS FOR A MATHEMATICAL CHAT BOT

(71) Applicant: Microsoft Technology Licensing, LLC, Redmond, WA (US)

(72) Inventors: Joseph Edwin Johnson, Jr., Seattle, WA (US); Emmanouil Koukoumidis, Kirkland, WA (US); Daniel Vann, Duvall, WA (US); Hailong Mu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 749 days.

(21) Appl. No.: 15/391,488

(22) Filed: Dec. 27, 2016

(65) Prior Publication Data
US 2018/0181855 A1 Jun. 28, 2018

(51) Int. Cl.
*G06N 3/00* (2006.01)
*G06N 5/04* (2006.01)
(Continued)

(52) U.S. Cl.
CPC ......... *G06N 3/006* (2013.01); *G06F 16/2428* (2019.01); *G06F 16/532* (2019.01); *G06F 16/9024* (2019.01); *G06F 16/9032* (2019.01); *G06N 3/0445* (2013.01); *G06N 5/022* (2013.01); *G06N 5/04* (2013.01); *G06N 5/027* (2013.01)

(58) Field of Classification Search
CPC ...... G06N 3/006; G06N 3/0445; G06N 5/022; G06N 5/04; G06N 5/027; G06F 16/9032; G06F 16/2428; G06F 16/532; G06F 16/9024
See application file for complete search history.

(56) References Cited

U.S. PATENT DOCUMENTS 8,589,869 B2 * 11/2013 Wolfram .................. G06F 8/30
717/109
9,576,210 B1 * 2/2017 Liu .......................... G06T 5/003
(Continued)

FOREIGN PATENT DOCUMENTS

| KR | 20060117860 A | 11/2006 |
|----|---------------|---------|
| WO | 2006129967 A1 | 12/2006 |
| WO | 2009077901 A1 | 6/2009 |

OTHER PUBLICATIONS

"Word2Vec", http://web.archive.org/web/20160216151956/http://deeplearning4j.org/word2vec, Published on: Feb. 16, 2016, 7 pages.
(Continued)

*Primary Examiner* — Hal Schnee
(74) *Attorney, Agent, or Firm* — Merchant & Gould

(57) ABSTRACT

Systems and methods for automated mathematical chatting. The systems and methods convert any identified non-numerical inputs into vectors and then perform the mathematical equation utilizing the vectors instead of the nonnumeric inputs along with any other identified numeric inputs to obtain a numerical vector result. The systems and methods decode the numerical vector result into a result feature and then search one or more databases for output based on the result feature. The systems and methods provide the selected output from the one or more databases in response to the mathematical query.

20 Claims, 9 Drawing Sheets

(51) Int. Cl.
*G06F 16/532* (2019.01)
*G06F 16/901* (2019.01)
*G06F 16/9032* (2019.01)
*G06F 16/242* (2019.01)
*G06N 5/02* (2006.01)
*G06N 3/04* (2006.01)

(56) References Cited

U.S. PATENT DOCUMENTS

| | | | | |
|---|---|---|---|---|
| 9,876,848 B1* | 1/2018 | Carroll | | G06K 9/00536 |
| 10,346,681 B2* | 7/2019 | Wolfram | | G06K 9/00442 |
| 2004/0030750 A1 | 2/2004 | Moore et al. | | |
| 2005/0270293 A1 | 12/2005 | Guo et al. | | |
| 2006/0001667 A1* | 1/2006 | LaViola, Jr. | | G06T 13/80 |
| | | | | 345/473 |
| 2012/0041903 A1 | 2/2012 | Beilby et al. | | |
| 2012/0260263 A1 | 10/2012 | Edoja | | |
| 2013/0166530 A1* | 6/2013 | Pilat | | G06F 16/34 |
| | | | | 707/708 |
| 2013/0226562 A1* | 8/2013 | Arnon | | G06F 17/10 |
| | | | | 704/9 |
| 2013/0275122 A1* | 10/2013 | Park | | G06F 40/30 |
| | | | | 704/9 |
| 2014/0091522 A1* | 4/2014 | Kelly | | A63F 1/12 |
| | | | | 273/149 R |
| 2014/0101119 A1 | 4/2014 | Li et al. | | |
| 2014/0122083 A1 | 5/2014 | Xiaojiang | | |
| 2014/0122619 A1 | 5/2014 | Duan | | |
| 2014/0376804 A1 | 12/2014 | Akata et al. | | |
| 2015/0066479 A1 | 3/2015 | Pasupalak et al. | | |
| 2016/0210532 A1 | 7/2016 | Soldevila et al. | | |
| 2016/0239751 A1* | 8/2016 | Mosterman | | G06N 5/02 |
| 2016/0313881 A1* | 10/2016 | Lehoux | | G06F 3/0484 |
| 2016/0314348 A1* | 10/2016 | Wang | | G09B 5/02 |
| 2018/0124162 A1* | 5/2018 | Carroll | | G06K 9/00536 |
| 2018/0247107 A1* | 8/2018 | Murthy | | G06K 9/00147 |
| 2019/0005358 A1* | 1/2019 | Pisoni | | G06N 3/08 |

OTHER PUBLICATIONS

Mikolov, et al., "Linguistic Regularities in Continuous Space Word Representations", In Proceedings of the Conference of the North American Chapter of the Association for Computational Linguistics: Human Language Technologies, Jun. 9, 2013, 6 pages.

Schuetzler, et al., "Facilitating Natural Conversational Agent Interactions: Lessons from a Deception Experiment", In Proceedings of Thirty Fifth International Conference on Information Systems, Dec. 15, 2014, pp. 1-16.

* cited by examiner

SYSTEMS AND METHODS FOR A MATHEMATICAL CHAT BOT

BACKGROUND

Bots are becoming more and more prevalent and are being utilized for more and more different tasks. Bots may be software applications that run automated tasks over a network, such as the Internet. Chat bots may be designed to conduct a conversation with a user via text, auditory, and/or visual methods to simulate human conversation. A chat bot may utilize sophisticated natural language processing systems or scan for keywords from a user input and then pull a reply with the most matching keywords or the most similar wording pattern from a database. However, chat bots are often limited to simple task driven conversations.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for automated mathematical chatting. The systems and methods as disclosed herein convert any identified non-numerical inputs into vectors and then perform the mathematical equation utilizing the vectors to obtain a numerical vector result. The systems and methods as disclosed herein decode the numerical vector result into a result feature and then search one or more databases for outputs based on the result feature. The systems and methods as disclosed herein provide a selected output from the one or more databases in response to the mathematical query.

One aspect of the disclosure is directed to a system for a mathematical chat bot. The system includes at least one processor and a memory. The memory encodes computer executable instruction that, when executed by the at least one processor, are operative to:
  collect a mathematical query;
  identify a variable that corresponds to each image of images in an equation in the mathematical query utilizing a mathematical knowledge graph to form corresponding variables;
  identify one or more mathematical operators in the equation in the mathematical query utilizing the mathematical knowledge graph;
  extract potential features for each image based on at least one of world knowledge and a natural language understanding system;
  filter the potential features;
  assign confidence scores to the potential features based on the filtering of the potential features;
  select a feature from the potential features for each image based on the confidence scores;
  encode the feature for each of the images into a vector;
  substitute the vector for each of the images into the corresponding variables;
  execute the equation to determine a result;
  decode the result into a result feature;
  search an image database for result images that correspond to the result feature;
  filter the result images;
  assign probability scores to the result images based on the filtering of the result images;
  select an answer image from the result images based on the probability scores; and
  provide the answer image to a user in reply to the mathematical query.

In another aspect, a method for automated mathematical chatting is disclosed. The method includes:
  collecting a mathematical query;
  identifying a variable that corresponds to each nonnumeric input of inputs in an equation in the mathematical query utilizing a mathematical knowledge graph to form corresponding variables;
  identifying a mathematical operator in the equation in the mathematical query utilizing the mathematical knowledge graph;
  extracting potential features for each nonnumeric input utilizing at least one of world knowledge and a natural language understanding system;
  filtering the potential features;
  assigning confidence scores to the potential features based on the filtering of the potential features;
  selecting a feature from the potential features for each nonnumeric input based on the confidence scores;
  converting the feature for each nonnumeric input into a vector;
  substituting the vector for nonnumeric input into the corresponding variables;
  executing the equation to determine a result;
  decoding the result into a result feature;
  searching a database for outputs that correspond to the result feature;
  filtering the outputs;
  assigning probability scores to the outputs based on the filtering of the outputs;
  selecting an answer from the outputs based on the probability scores; and
  providing the answer to a user in response to the mathematical query.

In yet another aspect of the invention, the disclosure is directed to a system for a mathematical chat bot. The system includes at least one processor and a memory. The memory encodes computer executable instruction that, when executed by the at least one processor, are operative to:
  collect a mathematical query with inputs, wherein at least one of the inputs is a nonnumeric input;
  identify a variable that corresponds to each nonnumeric input of the inputs in an equation in the mathematical query utilizing a mathematical knowledge graph to form corresponding variables;
  identify one or more mathematical operators in the equation in the mathematical query utilizing the mathematical knowledge graph;
  select a feature from potential features for each nonnumeric input utilizing a deep learning algorithm;
  convert the feature for each nonnumeric input into a vector;
  substitute the vector for each nonnumeric input into the corresponding variables;
  execute the equation to determine a result;
  decode the result into a result feature;
  search a database for outputs that correspond to the result feature;
  select an answer from the outputs; and
  provide the answer in response to the mathematical query.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1:
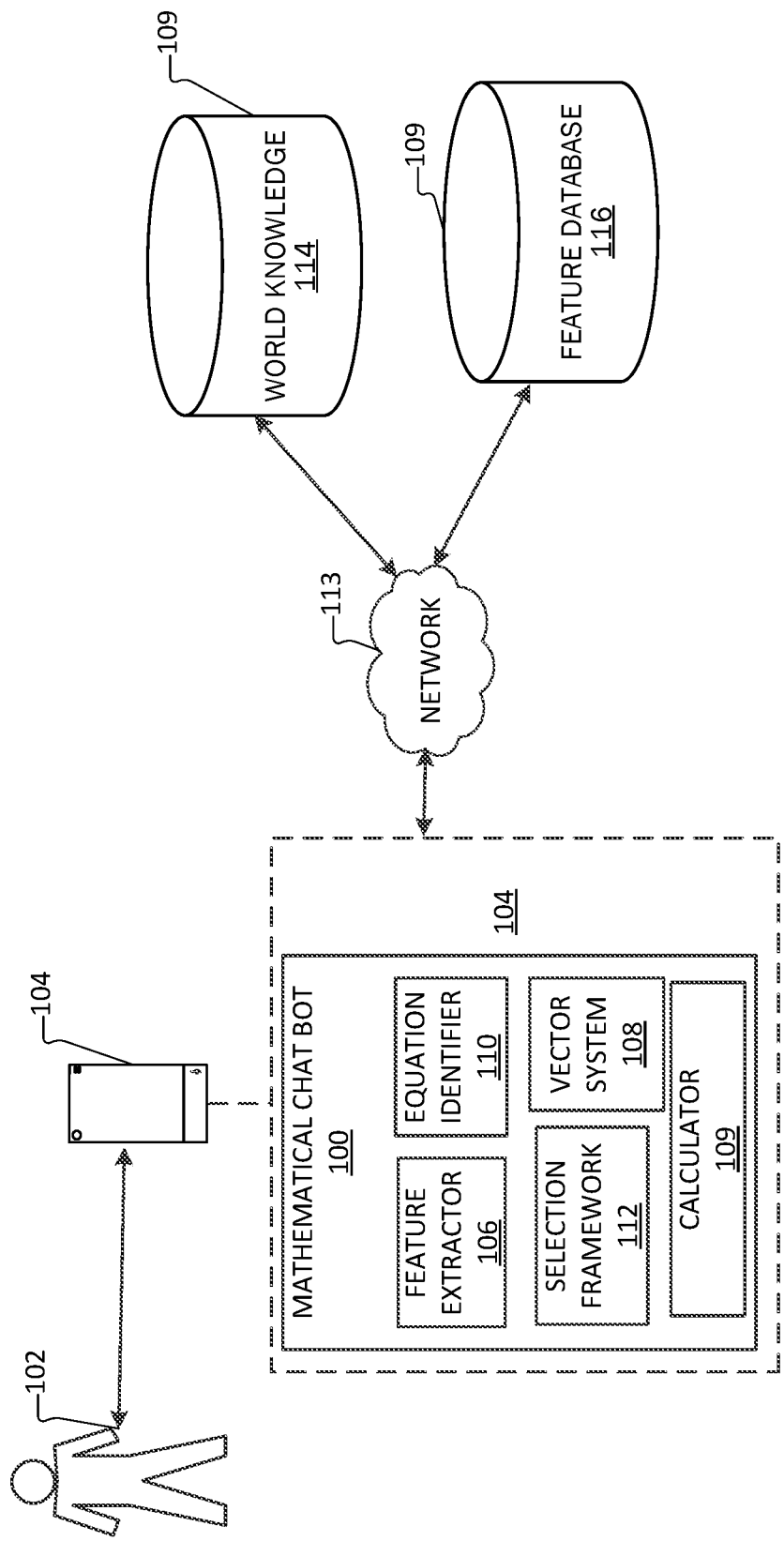
FIG. 1 is a schematic diagram illustrating a mathematical chat bot being utilized by a user via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

As understood by those skilled in the art, bots may be software applications that run automated tasks over a network, such as the Internet. In some aspects, a chat bot is a module on an application, such as a digital assistant. Chat bots are designed to conduct a conversation with a user via auditory or visual methods to simulate human conversation. However, chat bots are often limited to simple task driven conversations.

For example, currently utilized chat bots have a simple calculator function that may perform algebraic problems, such as 2+2=4, 3−2=1, 2×2=4, etc. Additionally, currently utilized chat bots includes a game where simple math problems are responded to with a random image that is not related to the above referenced math problem. These images are supposed to be humorous and are designed to entertain the user. However, currently utilized chat bots are not capable of actually performing simple math problems for inputs that do not directly correspond to a number, such as images, in an equation and return a logical result. As such, there is typically no system or method for providing automated mathematical chatting for inputs that are not numbers (e.g., such as 1, 2, 10, four, six, etc.).

The systems and methods as disclosed herein are directed to automated mathematical chatting. The systems and methods as disclosed herein convert identified non-numerical inputs into vectors and then perform the mathematical equation utilizing the vectors and any other number input in the equation to obtain a numerical result. The systems and methods as disclosed herein decode the numerical result into a natural language result feature and then search one or more databases for outputs based on the result. Next, the systems and methods as disclosed herein provide a selected output from the one or more databases in response to the mathematical query.

The ability of the systems and methods described herein to provide automated mathematical chatting for mathematical queries that include non-numerical inputs for a better, more efficient, and easier to use mathematical search. Additionally, the ability of the systems and methods described herein to provide automated mathematical chatting for mathematical queries that include non-numerical inputs provides for a fun, more engaging, and easier to use chat bot when compared to previously utilized chat bots that did not provide the ability to perform mathematical equations for inputs other than numbers. Additionally, the ability of the systems and methods described herein to provide automated mathematical chatting for mathematical queries that include non-numerical inputs improves the usability, improves the performance, and/or improves user interactions with a chat bot when compared to chat bots that do not provide the ability to reply to mathematical queries that include nonnumeric inputs.

Figure 2:
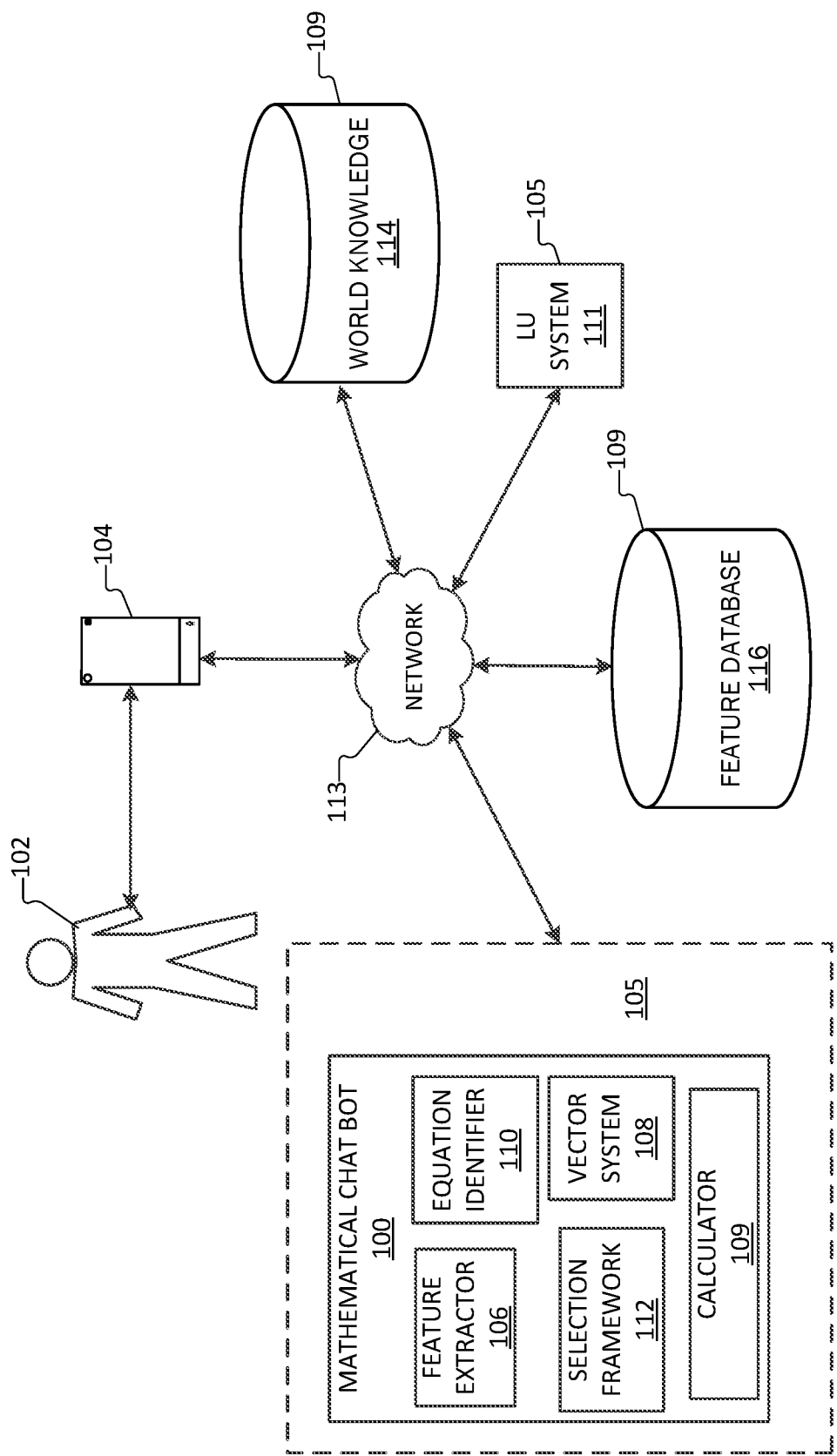
FIG. 2 a schematic diagram illustrating a mathematical chat bot on a server computing device being utilized by a user via a client computing device, in accordance with aspects of the disclosure.

FIGS. 1-2 illustrate different examples of a mathematical chat bot 100 being utilized by a user 102 via a client computing device 104, in accordance with aspects of the disclosure. The mathematical chat bot 100 is capable executing mathematical equations with one or more variables that represent nonnumeric inputs and proving an answer. The mathematical chat bot 100 converts identified non-numerical inputs into numerical vectors and then performs a mathematical equation utilizing the vectors and any numeric input in the equation to obtain a numerical result. The mathematical chat bot 100 decodes the numerical result into a natural language result feature and then searches one or more databases for outputs that correspond to the result feature. Next, the mathematical chat bot 100 provides a selected output from the one or more databases in response to the mathematical query. Accordingly, the mathematical chat bot 100 is a fun, an easy-to-use, an effective, and an engaging mathematical chat bot 100.

The mathematical chat bot 100 includes an equation identifier 110, a feature extractor 106, a vector system 108, and a selection framework 112. In some aspects, the mathematical chat bot 100 also includes a feature database 116. In other aspects, the feature database 116 is not part of the mathematical chat bot 100 and is separate and distinct from the mathematical chat bot 100. In these aspects, the mathematical chat bot 100 communicates with the feature database 116 through a network 113. In some aspects, the network 113 is a distributed computing network, such as the internet. The mathematical chat bot 100 may also communicate with world knowledge through a network 113.

In some aspects, the mathematical chat bot 100 is implemented on the client computing device 104 as illustrated by FIG. 1. In a basic configuration, the client computing device 104 is a computer having both input elements and output elements. The client computing device 104 may be any suitable computing device for implementing the mathematical chat bot 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the mathematical chat bot 100 may be utilized.

In other aspects, the mathematical chat bot 100 is implemented on a server computing device 105, as illustrated in FIG. 2. The server computing device 105 may provide data to and/or receive data from the client computing device 104 through a network 113. In further aspects, that mathematical chat bot 100 is implemented on more than one server computing device 105, such as a plurality or network of server computing devices 105. For example, the equation identifier 110 may be located on the same server 105 as the vector system 108 as illustrated in FIG. 2 or may be located on separate servers 105. In some aspects, the mathematical chat bot 100 is a hybrid system with portions of the mathematical chat bot 100 on the client computing device 104 and with portions of the mathematical chat bot 100 on one or more server computing devices 105.

The mathematical chat bot 100 collects a mathematical query. The term "collect" as utilized herein refers to the passive receiving or receipt of data and/or to the active gathering or retrieval of data. The mathematical query is a user question that includes a mathematical problem. As such, the mathematical query includes an algebraic equation. The equation identifier 110 of the mathematical chat bot 100 identifies any variables or any mathematical operators in the equation in the mathematical query. For example, the mathematical operator may be a square root operator, a cubed operator, a squared operator, a multiplication operator, a division operator, or any other known algebraic mathematical operator. The equation identifier 110 locates inputs in the mathematical query and assigns a variable to each input to form corresponding variables. In other words, each variable in the equation corresponds to a different nonnumeric identified input in the equation. A variable as utilized herein refers to a symbol that is utilized to represent an identified input in the equation. The symbol is often a letter like, A, B, C, X, or Y. While some of the inputs may be numbers or numerical, at least one of the inputs is not a number or numerical. The inputs may be any known data, such as an image, text, a uniform resource locator, an audio file, an application, a video, a website, a product, a celebrity, etc. The equation identifier 110 of the mathematical chat bot 100 utilizes a mathematical knowledge graph to identify the variables and mathematical operators in the equation. The mathematical knowledge graph links or associates that the term "add" or "sum" with a plus sign symbol, while the terms "subtract" or "net" are associated with a minus sign symbol. Further, equation identifier 110 utilizing the mathematical knowledge graph can identify common language patterns and link them to the appropriate mathematical operators. For example, the equation identifier 110 can identify the language pattern of "[input #1] is to [input #2] as [input #3] is to [input #4]" as a reference to the following equation: X−Y=A−B, where X=input #1, Y=input #2, A=input #3, and B=input #4. The mathematical chat bot 100 can rearrange this equation to solve for any of the inputs. For example, if the A is the unknown, the mathematical chat bot 100 can rearrange the above equation to "X−Y+B=A" utilizing simple algebraic rules and/or principles to solve for "A" the unknown variable.

Once the inputs in the mathematical query have been identified, the feature extractor 106 of the mathematical chat bot 100 extracts one or more potential features from each input. The feature extractor 106 utilizes a language understanding (LU) system 111 and/or world knowledge 114 to determine the one or more potential features for each input. In some aspects, the feature extractor 106 utilizes deep learning, such as a deep learning algorithm to determine the one or more potential features for each input based on the LU system 111 and/or world knowledge 114. The deep learning may utilize machine learning techniques and/or statistical modeling techniques. The deep learning learns or improves through use and/or based on received user feedback and/or world feedback. In some aspects, the deep learning is a recurrent neural network (RNN). The LU system 111 converts the inputs into text, annotated text, objects, and/or annotated objects. The LU system 111 includes application programming interfaces (APIs) for text understanding, speech recognition, and/or image/video recognition for processing inputs into text, objects, annotated text, and/or annotated to objects.

Sounds need to be recognized and decoded as texts. A speech recognition API may be necessary for the speech-to-text conversion task and is part of the LU system 111. Collected images also need to be recognized and changed into text or objects. As such, the LU system 111 may also include an image recognition API to "read" and "understand" received images from the user 102. The image recognition API of the LU system 111 translates or decodes received images into text or object(s).

In some aspects, the LU system 111 may be a part of the feature extractor 106 as illustrated in FIG. 1. In other aspects, the LU model is separate and distinct from the feature extractor 106 and/or the mathematical chat bot 100 as illustrated in FIG. 2. In these embodiments, the feature extractor 106 and/or the mathematical chat bot 100 communicate with the LU system 111 through a network.

The world knowledge 114 may be utilized to enrich or provide context to inputs, text, or objects to determine additional potential features. For example, GPS coordinates have no context value. However, upon a search of the world knowledge 114, the feature extractor 106 can determine that these coordinates are for a Starbucks at a specific address in Seattle, Wash. In response to this determination, a GPS coordinates input could generate potential features of "Starbucks" and "Seattle" based on the world knowledge. Further, the world knowledge 114 could identify additional potential features, such as "coffee shop" based on the identification of the "Starbucks" potential feature because the world knowledge 114 associates "Starbucks" with a coffee shop.

For example, if the input is an image of a female child building a snowman outside with a tree and a red bird in the background, the features identified for the input may be female, child, snowman, winter, tree, bird, cardinal, carrot, top hat, coal, and etc. These potential features may be extracted by the feature extractor 106 from the image utilizing world knowledge 114 that a red bird is usually a cardinal and utilizing an image-to-text application programming interface (API) in the LU system 111.

Each potential features is assigned a confidence score by the feature extractor 106. In some aspects, the feature extractor 106 utilizes deep learning techniques, such as deep learning algorithms to assign the confidence scores based on the one or more filters The confidence score indicates how likely the identified potential features is relevant to the input. The higher the confidence score, the more likely that a potential feature is relevant to an input. The confidence scores are determined based one or more filters. A filter is test or threshold that is compared to the potential feature to determine how relevant the potential feature is to the input. For example, the filters for an image may include a foreground or background determination, a specificity level determination, a pixel percentage determination, keyword similarity, etc. For example, filters for text may include a specificity level determination, a semantic similarity determination, an edit distance determination, and a phonetic similarity determination (e.g., words or phrases with equivalent definitions but have different phonetic spellings with have a high phonetic similarity), etc. For instance, based on the example above, the identified potential feature, "snowman," may have a higher confidence score than the identified potential feature, "tree," because the snowman is in the foreground while the tree is in the background of the image. Based on the example above, the identified potential feature, "cardinal" may have a higher confidence score than the identified potential feature, "bird" because "cardinal" is more specific than "bird." For example, for the words "food" and "good" an edit distance determination is a distance of 1 character because only one letter has to be changed for the words to be identical; however, the semantic similarity between "food" and "good" is very different since these words have very different definitions.

The feature extractor 106 selects a feature for each input based on the confidence scores assigned to the potential features for each input. In some aspects, the feature extractor 106 selects a feature for each input based on the potential feature for that input with the highest confidence score. In other aspects, the feature extractor 106 selects a feature at random from a predetermined number of potential features with the highest scores for a given input. In other aspects, if none of the confidences scores of any of the potential features for a given input meet a predetermine threshold, then the input is reanalyzed by the feature extractor 106 to determine new and/or better features. In these aspects, the selection framework 112 selects a feature for this input based on the confidence scores assigned to the new potential features determined based on the second analysis of the input by the feature extractor 106. Based on the example above, the feature extractor 106 may select the potential feature, "snowman" from the list of potential features, "female, child, snowman, winter, tree, bird, cardinal, carrot, top hat, and coal" because snowman had the highest confidence score.

There are several different types of features. A feature may be a keyword, a sentence, annotated keywords, annotated sentences, or a knowledge graph of keywords. As such, the potential features may be a list of keywords, a list of sentences, list of annotated keywords, a list of annotated sentences, or a list of keyword knowledge graphs. The examples provided above focus on the identification of keywords from a given input. However, the inputs from these same examples can be utilized to show how other types of features may be extracted from the inputs. For example, for the potential feature of "GPS coordinates," the feature extractor 106 may determine a potential feature sentence of "A Starbucks coffee shop located in downtown, Seattle, Wash." In other aspects, the potential feature "Starbuck" is tagged with the identifier of "coffee shop" to form an annotated keyword potential feature. Based on the example of a picture of an image of a female child building a snowman outside with a tree and a red bird in the background, the feature extractor 106 may determine a keyword knowledge graph potential features of "female+child+snowman+winter" or a sentence potential feature of "A female child building a snowman in the winter."

In some aspects, the input is a discrete item, such as a product or a celebrity. In these aspects, similar to above, the world knowledge 114 may be utilize to determine one or more potential features for these inputs or determine additional input that may be analyze to determine one or more potential features. For example, a summary of a product may be pulled from the world knowledge 114 and utilized by the feature extractor 106 to determine one or more potential features for the product. In another example, information from an internet movie database for an actor input may be found in the world knowledge 114 and utilized by the feature extractor 106 to determine one or more potential features for the actor.

In some aspects, the feature extractor 106 is preconfigured to identify only one type of feature and potential features. In other aspects, the feature extractor 106 is adaptable and will utilize or select the most appropriate type of feature and potential features based on the received input. In further aspects, the feature extractor 106 is preconfigured to identify only one type of input, such as images, text, products, uniform resources codes, websites, applications, and etc. In other aspects, the feature extractor 106 is adaptable and can identify any type of input utilizing the LU system 111 and/or the world knowledge 114.

Once a feature has been selected for each input by the feature extractor 106, the vector system 108 collects the selected features from the feature extractor 106. The vector system 108 encodes each feature into one or more vectors utilizing deep learning. In other words, the vector system 108 converts the natural language elements of an input into one or more numeric vectors. The deep learning may utilize machine learning techniques and/or statistical modeling techniques. The deep learning learns or improves through use and/or based on received user and/or world feedback. In some aspects, the deep learning is a RNN.

The calculator 109 collects the one or more vectors for each input from the vector system 108. The calculator 109 substitutes the one or more vectors into their corresponding variables in the equation. Once the vectors are appropriately placed in the equation, the calculator 109 executes the equation to determine an answer or result for the missing or unknown variable. The calculator 109 performs the appropriate calculation based the identified mathematical operators and each operator's positioning between the substituted vectors. The result is one or more numeric result vectors.

The vector system 108 collects the result from the calculator 109. The vector system 108 decodes the result into a result feature. In other words, the vector system 108 decodes the one or more results vectors into natural language content to form the result feature. In some aspects, the vector system 108 utilizes deep learning to decode the result into a result feature. In some aspects, the vector system 108 utilizes semantic knowledge to decode the result vector into natural language content. Semantic knowledge as utilized herein includes slot filling information. In some aspects, the deep learning utilized to decode the result may also utilize semantic knowledge from a LU system 111 to decode the result vector.

The result feature may be a keyword, an annotated keyword a sentence, an annotated sentence, or a knowledge graph of keywords. In some aspects, the result feature corresponds to the type of selected features for the inputs in the equation. In other aspects, the result feature corresponds to at least one type of selected features for the inputs in the equation. In further aspects, the result feature is different from and does not match any of the types of the selected features for the inputs in the equation.

Next, the selection framework 112 collects the result feature from the vector system 108. The selection framework 112 searches a feature database 116 for outputs that correspond to the result feature. An output in the feature database 116 corresponds to the result feature when the output meets a predetermined threshold of similarity between the output and result features. The feature database 116 is one or more databases that include one or more different types of annotated outputs. In some aspects, the annotated outputs include several different types of outputs, such as images, keywords, videos, URLs, websites, products, and etc. In other aspects, the annotated outputs include one type of output. In some aspects, the type of outputs matches the type of inputs in the equation. In other aspects, the type of outputs matches at least one type of one of the inputs in the equation. In further aspects, the type of the outputs does not match any of the types of the inputs in the equation. For example, if all of the inputs in the equation are images, the outputs may be images. In another example, if only some of the inputs in the equation are images, the output may also be an image.

The selection framework 112 selects an answer to the equation from the outputs that correspond to the result feature. In some aspects, the selection framework 112 assigns a probability score to each output from the feature database 116 that correspond to the result feature. The probability score may be determined based on filtering the outputs with on one or more filters. A filter, as discussed above, is a test or threshold that is compared to the output to determine how relevant the output is to the result feature. For example, the filters for an image output may include a foreground or background determination for the result features, a pixel percentage occupied by the result feature determination; a popularity determination for the output, a morality determination for the output, an advertising determination, etc. For example, filters for text outputs may include a specificity level determination, a semantic similarity determination, an edit distance determination, and a phonetic similarity determination, a popularity determination for the output, a morality determination for the output, an advertising determination, etc. For example, output images that contain the result feature in the foreground, are more popular, show the result feature with higher pixel percentages, are not vulgar, violent, or inappropriate in some way, or display a desired brand will be scored above images that contain the result feature in the background, are unpopular or less popular, show the result feature with a low pixel percentage, are vulgar, violent, or inappropriate in some way, and/or display a undesired brand. Every filter is not equal. Some filters will be given higher weights than other filters. For example, a morality filter may give higher weight than a pixel percentage filter and a foreground/background filter may be given more weight than a popularity filter.

Figure 3:
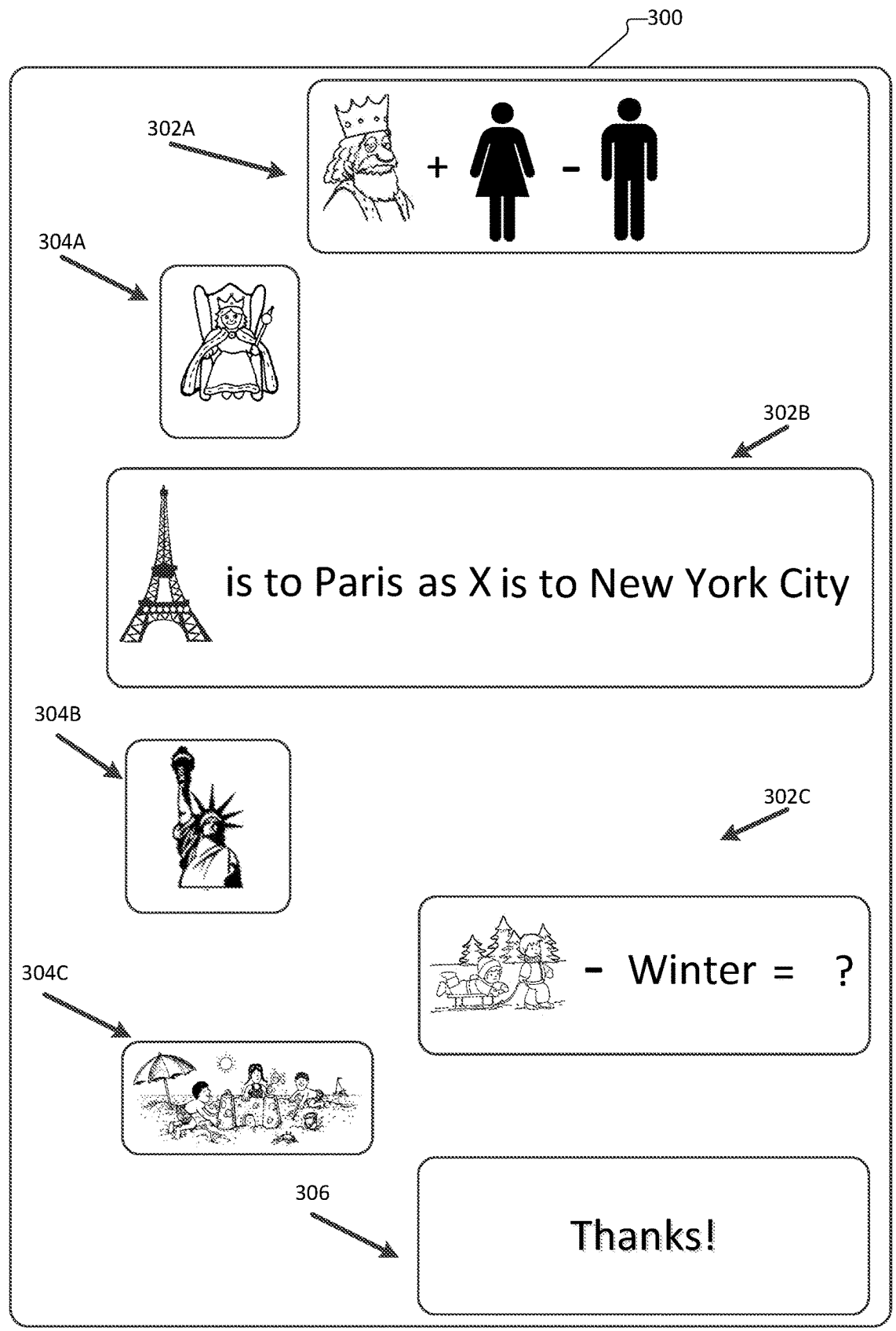
FIG. 3 is schematic diagram illustrating a screen shot of a user interface for a mathematical chat bot including user mathematical queries and chat bot responses to the mathematical queries, in accordance with aspects of the disclosure.

For instance, based on the mathematical query 302B in FIG. 3, an identified first output picture of a "queen" may have higher probability score than a second output picture of a "queen", because the first picture has a larger pixel percentage for the "queen" in the image and a higher popularity than the second output picture of the "queen." Additionally, a third output picture of a "queen" may have the lowest probability score because the image includes inappropriate content, such as violence.

In some aspects, the selection framework 112 selects an answer based on the output with the highest probability score. In other aspects, the selection framework 112 selects an answer at random form outputs with a probability scores above a predetermined threshold or at random from a set number of outputs with the highest probability scores.

In some aspects, if none of the outputs meet a predetermine probability score, the selection framework of the mathematical chat bot 100 searches for new outputs in the feature database 116 to determine outputs with higher probability scores that meet a predetermined probability score threshold. The answer will then be selected from these new outputs by the selection framework 112.

The answer selected by the selection framework 112 is provided in response to the collected user mathematical query by the mathematical chat bot 100. In some aspects, the answer is provided to the user 102 by sending instructions to a client computing device 104 to provide the natural language answer to the user 102. The client computer device 104 may provide the answer to the user 102 via any known suitable output methods, such as voice, image, text, video, and/or etc. For example, the client computing device 104 may display the answer as text, an image, and/or a video on a user interface.

In some aspects, the mathematical chat bot 100 monitors user feedback for the provided answer. The feedback may be explicit or implicit from the user 102. Explicit feedback is when the user provides or inputs a comment about a provided answer. For example, the user 102 may select or input that an answer is good or not good. In contrast, implicit feedback is the monitoring of user behavior in response to a provided answer. For example, the pattern of use of mathematical chat bot 100 may be monitored to determine user feedback by the mathematical chat bot 100. The user feedback is collected and provided to the deep learning algorithms or techniques utilized by mathematical chat bot 100. In some aspects, the mathematical chat bot 100 does not collect any feedback regarding a given answer. In other aspects, world feedback is collected by the mathematical chat bot 100. The world feedback includes any training or update data for the mathematical chat bot 100 that is collected through a network from an external source. As such, the world and/or user feedback may be utilized to update or train the deep learning techniques utilized by the mathematical chat bot 100.

FIG. 3 illustrates an example of a screen shot of a user interface 300 of the user's client computing device 104 during a conversation with a mathematical chat bot 100. In the user interface (UI) 300 shown in FIG. 3, the user 102 inputs three different mathematical queries 302 into the UI 300 of the client computing device. The chat bot 100 replies in the user interface 300 with three different answers 304, as illustrated in FIG. 3.

The first mathematical query 302A recites, "[an image of king]+[an image of woman]−[an image of man]." First query 302A utilizes or recognizes the images as the inputs and the symbols as the mathematical operators. The mathematical chat bot 100 receives the first query 302A and replies with a first answer 304A of the same type, an image of queen. The mathematical chat bot 100 is able to interpret the mathematical symbols and the inputs into keywords to determine an algebraic equation of: "king" plus "woman" minus "man" equals "an unknown." As discussed above, the mathematical chat bot 100 executes the identified equation by replacing numeric vectors for the keyword inputs of king, woman, and man. The result is a result vector. The numerical result vector can be decoded into a natural language keyword of "queen." The mathematical chat bot 100 searches one or image databases for pictures of a queen. All of the pictures of the queen are then assigned a probability score based one or more filters. The picture of a queen with the highest probability score is selected from all the pictures of the queen and provided as the first answer 304A in FIG. 3.

The second mathematical query 302B recites, "[an image of Eiffel tower] is to Paris as X is to New York City," as illustrated FIG. 3. Second query 302B utilizes images and text as the inputs and words as the mathematical operators. The mathematical chat bot 100 receives the second query 302B and replies with a second answer 304B of the same type as one of the inputs, an image of the statue of liberty. The mathematical chat bot 100 is able to interpret the words into mathematical operators and the image and text inputs into keywords to determine an algebraic equation of "Eiffel Tower" minus "Paris" plus "New York City" equals "an unknown." As discussed above, the mathematical chat bot 100 executes the identified equation by replacing numeric vectors for the keyword inputs of Eiffel Tower, Paris, and New York City. The result is a numerical result vector. The numerical result vector is decoded into a natural language feature by the mathematical chat bot 100, such as "a major New York City Landmark." The mathematical chat bot 100 searches one or more image databases for pictures of major New York City Landmarks. All of the pictures of the landmarks are then assigned a probability score based on the one or more filters. The landmark image with the highest probability score is selected from all the landmark pictures and provided as the second answer 304B in FIG. 3. For example, pictures of the empire state building and the metropolitan art museum may be found; however, a picture of the statue of liberty has the highest probability score. As such, the mathematical chat bot 100 selects and provides the image of the statue of liberty.

The third mathematical query 302C recites, "[an image of kids playing outside in the winter]—winter," as illustrated FIG. 3. Third query 302C utilizes images and text as the inputs and a symbol as the mathematical operator. The mathematical chat bot 100 receives the third query 302C and replies with a third answer 304C of the same type as one of the inputs, an image of the kids playing outside in the summer. The mathematical chat bot 100 is able to interpret the minus sign symbol into a mathematical operator and the image and text inputs to determine an algebraic equation of "(kids+playing outside+ winter+ daytime)" minus "winter" equals "an unknown." In this example, the image input of third query 302C is converted into a keyword knowledge graph instead of just into one keyword. As discussed above, the mathematical chat bot executes the identified equation by replacing numeric vectors for the inputs of kids, playing outside, winter, daytime, and winter. The result is a result vector that can be decoded into a feature, such as "kids+ playing outside+ summer+ daytime". The result feature is also a keyword knowledge graph matching one of the types of the input features in the third mathematical query 302C. The mathematical chat bot 100 searches one or more image databases for pictures of "kids+playing outside+ summer+ daytime". All of the pictures are then assigned a probability score based on the one or more filters. The images of "kids+playing outside+ summer+ daytime" with the highest probability score is selected from all the images and provided as the third answer 304C in FIG. 3. As such, the mathematical chat bot 100 selects and provides a picture of kids playing outside in the summer during the day. The user 102 provided user feedback 306 in reply to the chat bot's third answer 304C. This user feedback 306 may be utilized by the chat bot 100 to train or update the deep learning utilized by the chat bot 100.

While all of the examples as provided herein are logical questions with correct answers, the mathematical chat bot 100 is capable of answering mathematical queries that do not necessarily have an obvious logical answer. For example, the mathematical chat bot will be able to answer a user query of: "What is the square root of [a picture of salsa]?" by performing the processes discussed above. As such, the user 102 may input fun or silly mathematical queries and get a reasoned logic answer back from the mathematical chat bot 100. For example, the mathematical chat bot 100 may answer the above example query above of, "What is the square root of [a picture of salsa]?" with images of tomatoes, an onion, cilantro, and jalapenos.

Additionally, while all of the examples provided above do not include any numerical inputs, the chat bot 100 is capable of responding to mathematical queries that include only include numerical inputs or include numerical inputs along with one or more nonnumeric inputs. For example, the chat bot 100 may respond to a mathematical query of, "salsa×2" with a response of "guacamole."

Figure 4:
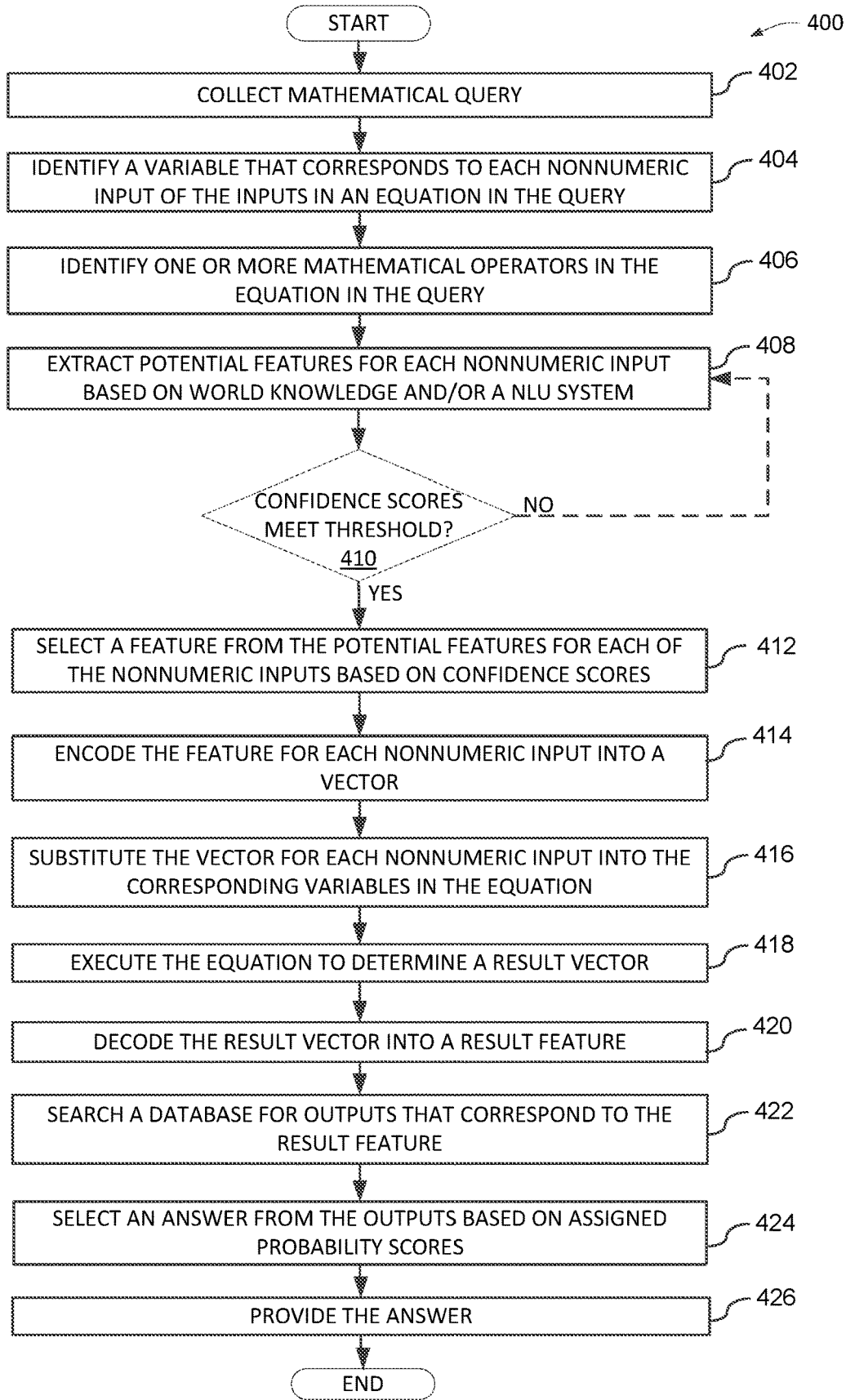
FIG. 4 is block flow diagram illustrating a method for automated mathematical chatting, in accordance with aspects of the disclosure.

FIG. 4 illustrates a flow diagram conceptually illustrating an example of a method 400 for automated mathematical chatting. In some aspects, method 400 is performed by the mathematical chat bot 100 as described above. Method 400 is a method for responding to mathematical queries that include at least one nonnumeric input and proving an answer. Accordingly, method 400 is a fun, an easy-to-use, an effective, and an engaging method for automated mathematical chatting.

Method 400 starts at operation 402. At operation 402, a mathematical query from a user and/or client computing device is collected. The mathematical query includes an equation with one or more inputs and one or more mathematical operators.

After operation 402, operation 404 is performed. At operations 404, a variable is identified that corresponds to each input of the inputs in an equation in the mathematical query to form one or more corresponding variables. In some aspects, the one or more variables are identified utilizing a mathematical knowledge graph. For example, if an equation has two inputs, then a different variable is identified for each input at operation 404. As discussed above, the one or more inputs may be any discernable data, such as an image, text, a uniform resource locator, an audio file, an application, a video, a product, a brand, a celebrity, location, GPS coordinates, and a website. Additionally, one or more of the inputs may be number or directly correspond to a number, as long as, not all of the inputs in equation are a number or directly correspond to a number (e.g., 10, ten, 5, five, seven, II, etc.).

After operation 402, operation 406 is performed. At operation 406, one or more mathematical operators are identified in the equation in the mathematical query. In some aspects, the one or more mathematical operators are identified utilizing a mathematical knowledge graph. For example, if an equation has a multiplication sign and a division sign, these operators are identified at operation 406. Additionally, order of the inputs/corresponding variables and the identified mathematical operators in the equation are maintained or determined at operations 402 and 404. The mathematical operator may be any suitable mathematical operator for an algebraic equation, such add, subtract, divide, multiply, square, cube, square root, derivatives, +, −, x, *, √, ∫, etc.

After operation 404, operation 408 is performed. At operation 408, potential features are extracted for each input based on world knowledge and/or a language understanding system. In some aspects, operation 408 is performed utilizing deep learning.

Further at operation 408, the one or more potential features for each input are filtered. The one or more filters may be utilized to determine the most relevant one or more potential features. Some filters may be given more weight than other filters. Next at operation 408, confidence scores are assigned to each of the potential features for each input based on the filtering results. The higher the confidence score, the more relevant the potential feature is to the input the feature was extracted from.

In some aspects, method 400 includes operation 410. In other aspects, method 400 moves from operation 408 to operation 412. At operation 410, the confidence scores for every feature for each input are compared to a confidence threshold. If at least one of the scores meets the threshold at operation 410 based on the comparison, then operation 412 is performed. If none of the feature scores for a given input meet the threshold at operation 410 based on the comparison, then operation 408 is performed again for this given input. During the re-performance of operation 408 for an identified input, new potential features are extracted for this input based on at least one of the world knowledge and the natural language understanding system. Next, the new potential features are filtered at operation 408. Finally, new confidence scores are assigned to the new potential features based on the filtering of the new potential features. After the re-performance of operation 408, operation 410 or operation 412 may be performed At operation 412, a feature is selected from the potential features for each of the inputs based on the confidence scores. In some aspects, the potential features include the new potential features. In some aspects, the feature selected for each input at operation 412 is the potential features for the output with highest confidence score. In other aspects, the feature selected for each input at operation 412 is selected at random from any feature that meets a predetermine confidence score.

After the performance of operation 412, operation 414 is performed. At operation 414, the feature for each of the inputs is encoded into a vector or a plurality of vectors. For example, if there are two inputs, the selected feature for the first input will be encoded into a first vector and the selected feature for the second input will be encoded into a second vector.

At operation 416 the vector or plurality of vectors for each of the inputs is substituted into the corresponding variables. For example, if there are two inputs, the first vector formed based on the selected feature for the first input will be substituted into a first variable in the equation that corresponds to the first input and the second vector formed based on the selected feature for the second input will be substituted into a second variable in the equation that corresponds to the second input.

After the performance of operation 416, operation 418 is performed. At operation 418, the equation is executed to determine a result. The equation includes executing each identified mathematical operators based on the operator positioning with any substituted vectors encoded from the selected features and any identified numeric input. As discussed above, the result is one or more numerical vectors.

At operation 420, the result is decoded into a result feature. In some aspects, the result feature is in natural language form.

At operation 422, one or more feature databases are searched for outputs that correspond to the result feature. In some aspects, the outputs in the one or more feature databases are annotated to allow for searching of the outputs based on the result feature. The result feature may be utilized to search any desired type of output in the feature database, such as an image, video, website, product, text, celebrity, URL, application, etc.

Further at operation 422, the outputs that are identified as corresponding to the results feature are filtered with one or more filters. Some filters may be given more weight than other filters. Next at operation 422, a probability score is assigned to each output based on the filtering. For example, the higher the probability score, the better the output. In some aspects, if none of the probability scores for any of the outputs meet a predetermined probability threshold, then operations 420 and 422 may performed again to generate new outputs with one or more probability scores that meet a predetermined probability threshold.

Next, at operation 424 an answer is selected from the outputs identified in operation 422 based on the assigned probability scores. In some aspects at operation 424 the answer is selected from new outputs with new probability scores identified by the re-performance of operations 420 and/ 422. In some aspects, the answer is the output with best probability score. In other aspects, the answer is selected at random from a predetermine number of outputs with the highest probability scores.

Next, at operation 426 the answer is provided in response to the mathematical query. In some aspects, at operation 426, the answer is provided to the user by sending instructions to a client computing device to provide the answer to the user. The client computer device may provide the answer to the user via any known suitable output, such as voice, image, text, video, and/or etc. For example, the client computing device may display the answer as text or an image on a user interface at operation 426.

In some aspects, method 400 also collects user or world feedback. The collected feedback is utilized to update and/or train any of the deep learning algorithms and/or techniques utilized by method 400. This training and/or updating based on feedback allows the deep learning techniques to improve and become more effective with each use.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
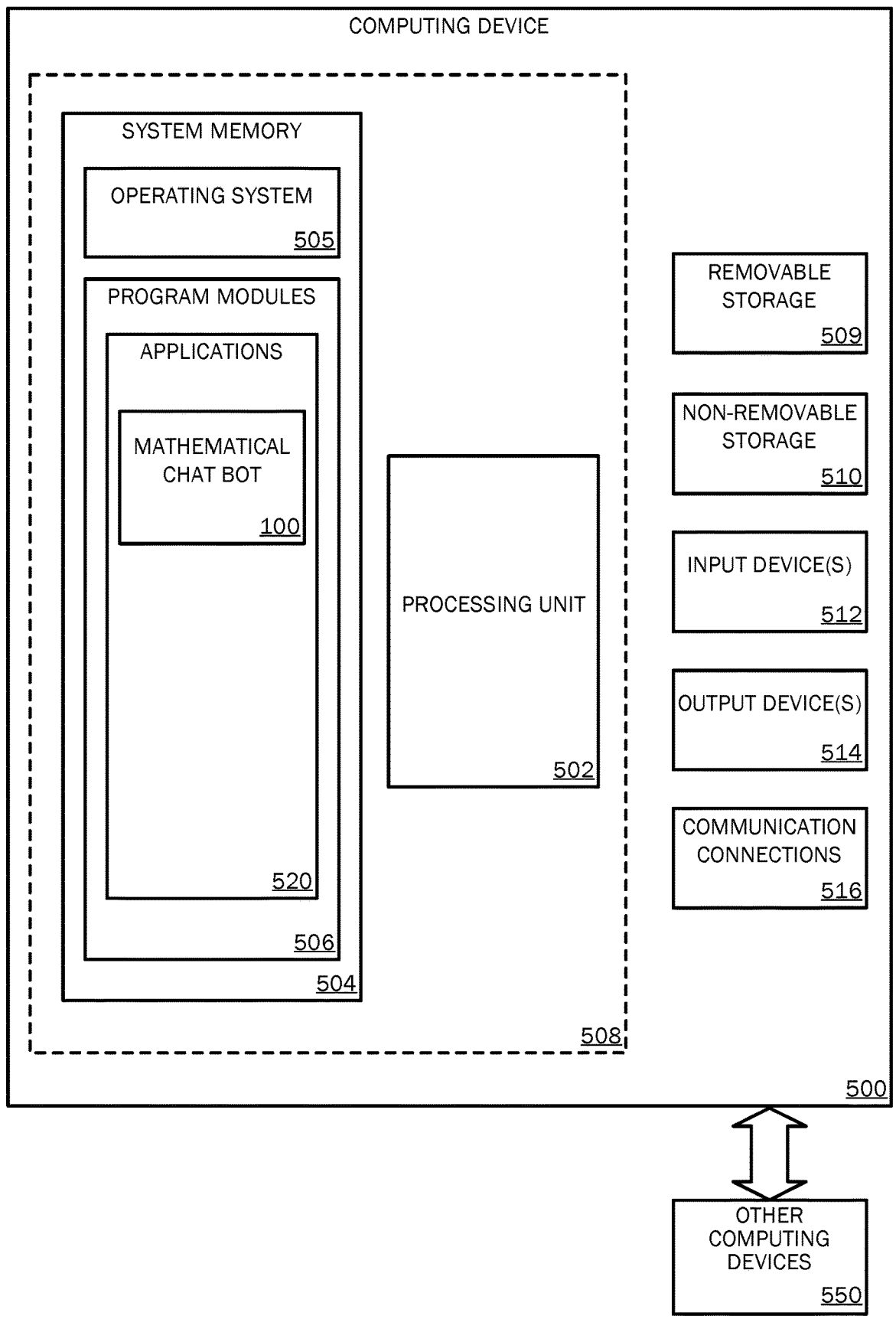
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the mathematical chat bot 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the mathematical chat bot 100 that can be executed to employ method 400 to respond to a user mathematical query as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the feature extractor 106, the vector system 108, the calculator 109, the equation identifier 110, and the selection framework 112) may perform processes including, but not limited to, performing method 400 as described herein. For example, the processing unit 502 may implement the mathematical chat bot 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the mathematical chat bot 100 allows a user to ask mathematical queries in one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
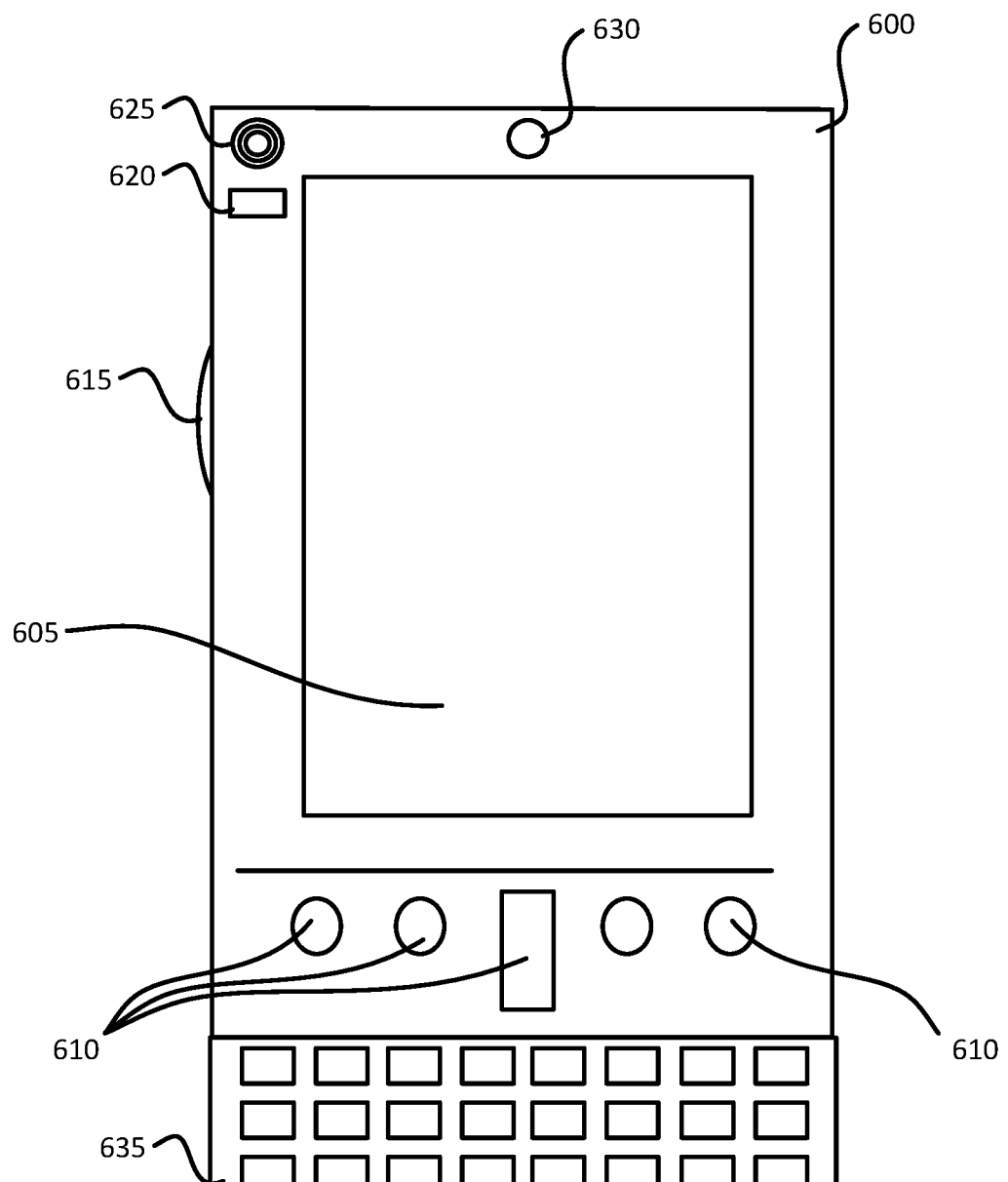
FIG. 6A is a simplified block diagram of a mobile computing device with which various aspects of the disclosure may be practiced.
Figure 6B:
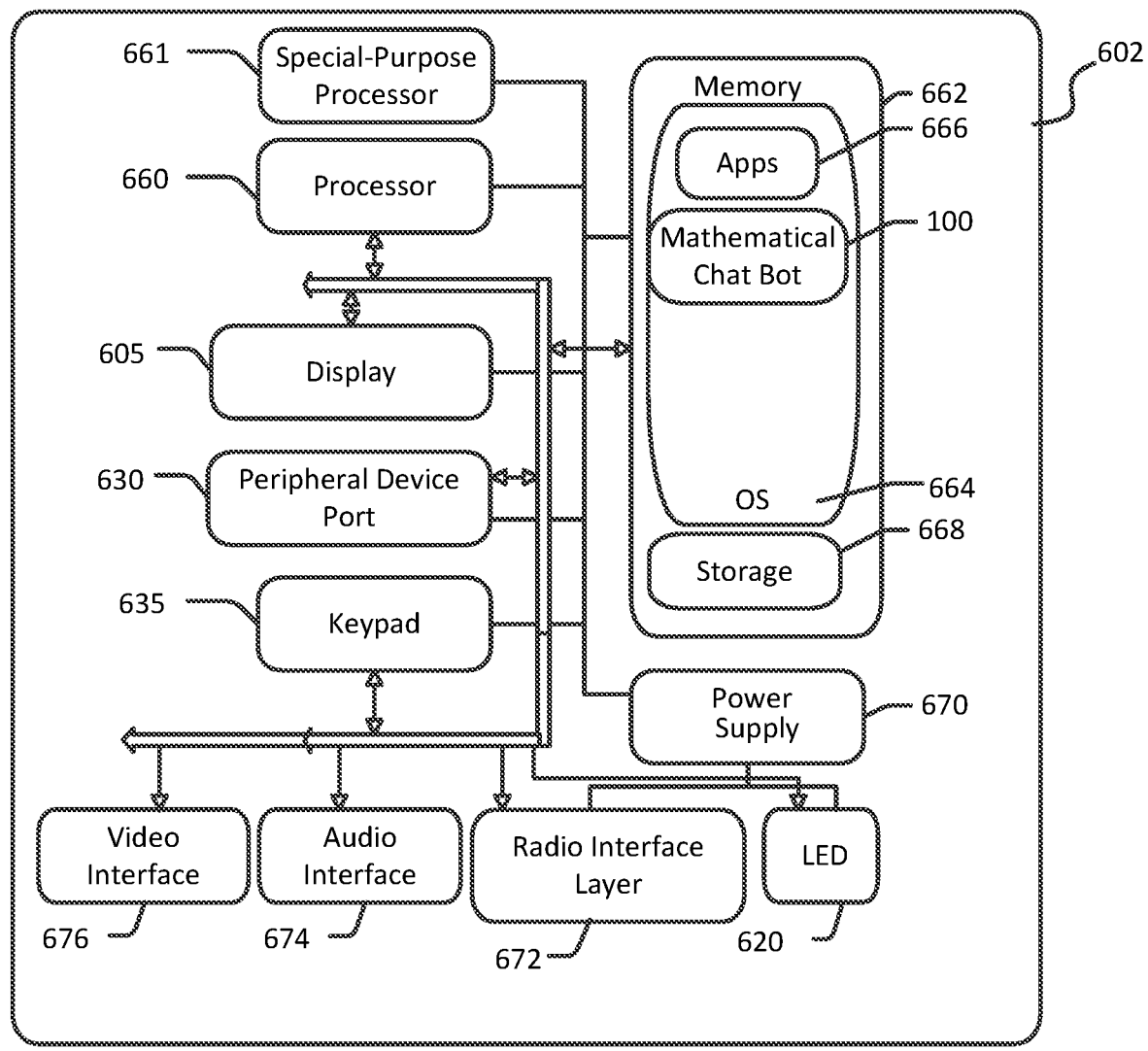
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the mathematical chat bot 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
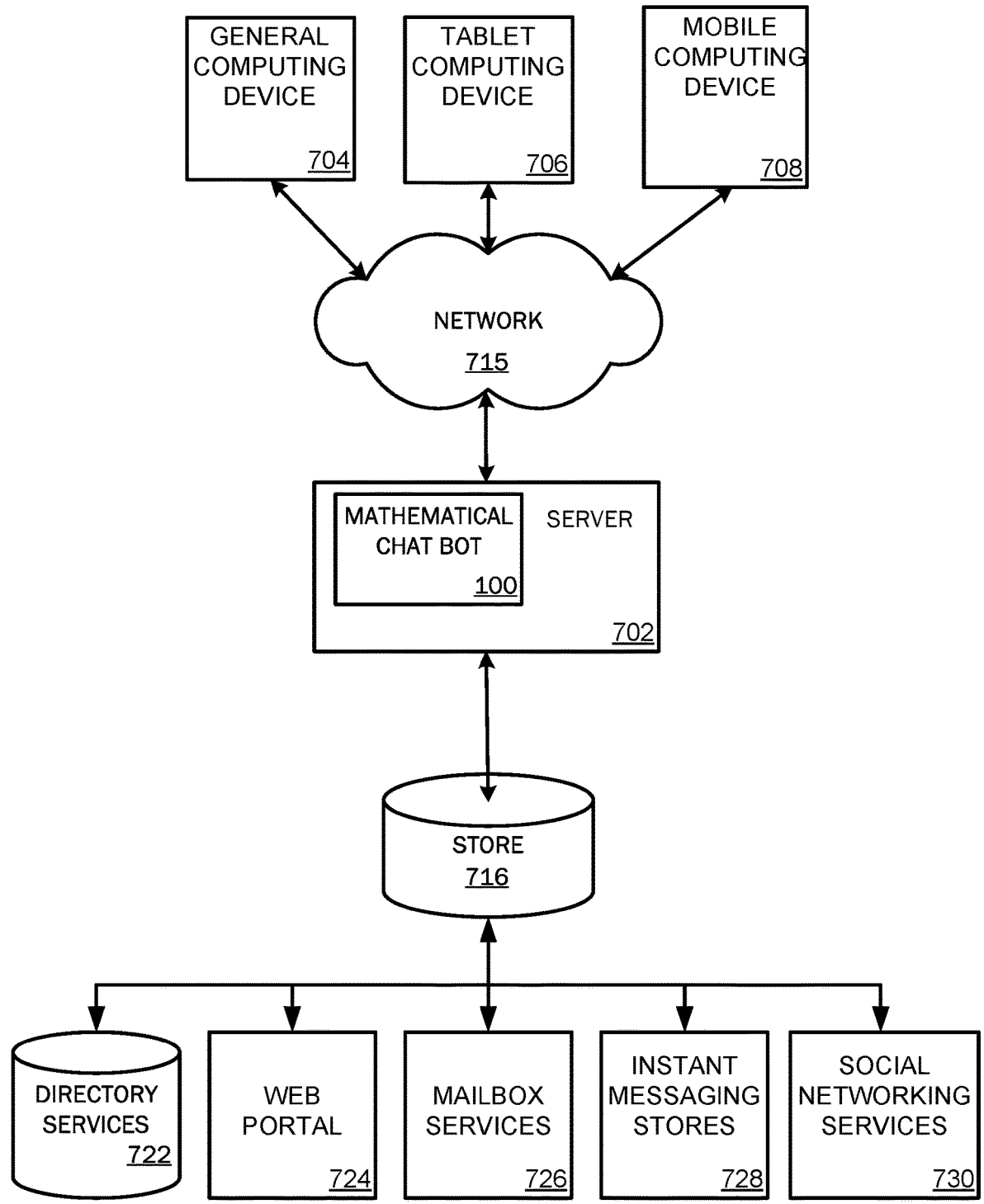
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the mathematical chat bot 100 may be implemented in a general computing device 704, a tablet computing device 706 and/or a mobile computing device 708 (e.g., a smart phone). In some aspects, the server 702 is configured to implement the mathematical chat bot 100 via the network 715 as illustrated in FIG. 7.

Figure 8:
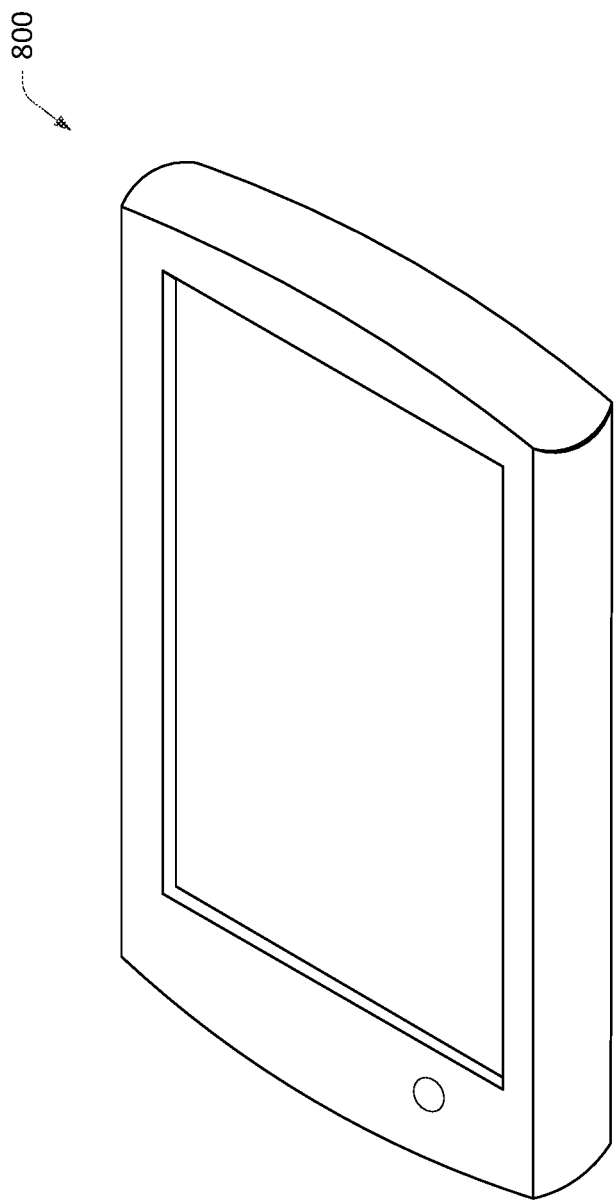
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for a mathematical chat bot, the system comprising:
   at least one processor; and
   a memory for storing and encoding computer executable instructions that, when executed by the at least one processor is operative to:
   collect a mathematical query from a user, the mathematical query comprising an equation having a nonmathematical image and a mathematical operator;
   identify the mathematical operator in the equation utilizing a mathematical knowledge graph;
   identify a variable that corresponds to the image in the equation utilizing the mathematical knowledge graph to form the corresponding variable for the image in the equation;
   extract features for the image based on at least one of world knowledge and a natural language understanding system;
   filter the features;
   assign confidence scores to the features based on the filtering of the features;
   select a feature from the features for the image based on the confidence scores;
   encode the selected feature for the image into a vector;
   substitute the corresponding variable for the image with the vector in the equation;
   execute the equation to determine a result of the equation;
   decode the result of the equation into a result feature representing a decoded version of the result of the equation;
   search an image database for result images that correspond to the result feature representing the decoded version of the result of the equation;
   filter the result images;
   assign probability scores to the result images based on the filtering of the result images;
   select an answer image from the result images based on the probability scores; and
   provide the answer image to the user in reply to the mathematical query.

2. The system of claim 1, wherein the selected feature is a keyword.

3. The system of claim 1, wherein the selected feature is a sentence.

4. The system of claim 1, wherein the selected feature is a knowledge graph of keywords.

5. The system of claim 1, wherein the features are keywords.

6. The system of claim 1, wherein the features are sentences.

7. The system of claim 1, wherein the features are knowledge graphs of keywords.

8. The system of claim 1, wherein to filter the features further comprises:
   determining whether each of the features is in a foreground or background;
   determining a specificity level for each of the features; and
   determining a pixel percentage occupied by each of the features.

9. The system of claim 1, wherein to filter the result images further comprises:
   determining whether the result feature is in a foreground or background in each of the result images;
   determining a pixel percentage occupied by the result feature in each of the result images; and
   determining a popularity of each of the result images.

10. The system of claim 1, wherein a deep learning algorithm is utilized to extract the features for the image based on at least one of the world knowledge and the natural language understanding system, and wherein deep learning techniques are utilized to encode the selected feature for the image into the vector.

11. The system of claim 1, wherein the result images and the answer image are products.

12. A method for automated mathematical chatting, the method comprising:
- collecting a mathematical query from a user, the mathematical query comprising an equation with one or more nonmathematical objects and a mathematical operator, wherein the one or more objects include one or more of a nonmathematical image and nonmathematical text;
- identifying the mathematical operator in the equation utilizing a mathematical knowledge graph;
- identifying a variable that corresponds to the one or more objects in the equation utilizing the mathematical knowledge graph to form the corresponding variable for the one or more objects in the equation;
- extracting features for the one or more objects utilizing at least one of world knowledge and a natural language understanding system;
- filtering the features;
- assigning confidence scores to the features based on the filtering of the features;
- selecting a feature from the features for the one or more objects based on the confidence scores;
- converting the selected feature for the one or more objects into a vector;
- substituting the corresponding variable for the one or more objects with the vector in the equation;
- executing the equation to determine a result of the equation;
- decoding the result of the equation into a result feature representing a decoded version of the result of the equation;
- searching a database for outputs that correspond to the result feature representing the decoded version of the result of the equation;
- filtering the outputs;
- assigning probability scores to the outputs based on the filtering of the outputs;
- selecting an answer from the outputs based on the probability scores; and
- providing the answer to the user in response to the mathematical query.

13. The method of claim 12, wherein the one or more objects in the equation include the nonmathematical image and the nonmathematical text.

14. The method of claim 12, wherein the one or more objects in the equation further include one or more of a uniform resource locator, an audio file, an application, a video, and a website.

15. The method of claim 12, wherein the one or more objects in the equation and an output, from the outputs, selected as the answer are products.

16. The method of claim 12, wherein the selected feature is a keyword, a sentence, or a knowledge graph of keywords.

17. The method of claim 12, further comprising:
- determining that the confidence scores for the features do not meet a predetermined threshold;
- in response to the determining that the confidence scores do not meet the predetermined threshold:
  - extracting new features for the one or more objects utilizing at least one of the world knowledge and the natural language understanding system;
  - filtering the new features;
  - assigning new confidence scores to the new features based on the filtering of the new features;
  - wherein selecting the feature from the features for the one or more objects based on the confidence scores comprises selecting the feature from the new features based on the filtering of the new features.

18. The method of claim 12, wherein the mathematical operator is a square root operator, a cubed operator, a squared operator, a multiplication operator, or a division operator.

19. The method of claim 12, wherein searching the database for the outputs comprises:
- searching the database for a type of output that matches a type of the one or more objects in the equation.

20. A system for a mathematical chat bot, the system comprising:
- a computing device including a processing unit and a memory, the processing unit implementing a search engine and a conversation layer, wherein the computing device is operable to:
  - collect a mathematical query comprising an equation with inputs, wherein at least one of the inputs is a nonmathematical object that includes one of a nonmathematical image and nonmathematical text;
  - identify a mathematical operator in the equation utilizing a mathematical knowledge graph;
  - identify a variable that corresponds to the object in the equation utilizing the mathematical knowledge graph to form the corresponding variable for the object in the equation;
  - select a feature from features for the object utilizing a deep learning algorithm;
  - convert the feature for the object into a vector;
  - substitute the corresponding variable for the object with the vector in the equation;
  - execute the equation to determine a result of the equation;
  - decode the result of the equation into a result feature representing a decoded version of the result of the equation;
  - search a database for outputs that correspond to the result feature representing the decoded version of the result of the equation;
  - select an answer from the outputs; and
  - provide the answer in response to the mathematical query.

* * * * *